(12) United States Patent
Takach, Jr.

(10) Patent No.: US 9,164,508 B1
(45) Date of Patent: *Oct. 20, 2015

(54) UNMANNED VEHICLE RETROFITTING SYSTEM

(75) Inventor: George A. Takach, Jr., Sandy, UT (US)

(73) Assignee: Kairos Autonomi, Sandy, UT (US)

( * ) Notice: Subject to any disclaimer, the term of this patent is extended or adjusted under 35 U.S.C. 154(b) by 99 days.

This patent is subject to a terminal disclaimer.

(21) Appl. No.: 12/760,801

(22) Filed: Apr. 15, 2010

Related U.S. Application Data

(60) Provisional application No. 61/170,025, filed on Apr. 16, 2009.

(51) Int. Cl.
*G05D 1/00* (2006.01)
*G05D 1/02* (2006.01)

(52) U.S. Cl.
CPC ....................................... *G05D 1/021* (2013.01)

(58) Field of Classification Search
CPC ............... B60T 7/12; B60T 7/16; B62D 1/00; B62D 1/24; B62D 1/283; B62D 1/286; G05D 1/0011; G05D 1/0061; G05D 2201/02; G05D 2201/0201; G05D 2201/0207; G05D 2201/0209; G05D 2201/0213
USPC ........ 701/1–2, 23, 25, 27; 180/167, 168, 316, 180/320, 333, 334, 335; 73/118.01
See application file for complete search history.

(56) References Cited

U.S. PATENT DOCUMENTS

| | | | |
|---|---|---|---|
| 4,742,720 A | 5/1988 | Storck | |
| 5,473,540 A * | 12/1995 | Schmitz | ............................ 701/1 |
| 5,821,718 A | 10/1998 | Shaffer et al. | |
| 6,633,800 B1 | 10/2003 | Ward et al. | |
| 6,988,583 B2 | 1/2006 | Turner | |
| 7,349,779 B2 | 3/2008 | Nelson | |
| 7,431,325 B2 | 10/2008 | Stahle | |
| 7,894,951 B2 | 2/2011 | Norris et al. | |
| 8,051,936 B1 * | 11/2011 | Hebert et al. | ................. 180/167 |
| 2009/0099710 A1 | 4/2009 | Takach, Jr. | |

OTHER PUBLICATIONS

Autofarm, "Simple and Reliable Hands-Free GPS Assisted Steering," no date, 2 pages. http://www.cultiva.com/_resources/uploads/files/OnTRac%20quality.pdf.

Axion, LLC. "DARPA Grand Challenge 2005, Technical Paper," Aug. 11, 2005, 13 pages, http://www.darpa.mil/grandchallenge05/techpapers.html.

Castleton, Karl, et al., Technical Paper Team Mojavaton Car #1, DARPA Grand Challenge 2005,: Aug. 28, 2005, 8 pages, http://www.darpa.mil/grandchallenge05/techpapers.html.

(Continued)

*Primary Examiner* — Thomas G Black
*Assistant Examiner* — Ce Li
(74) *Attorney, Agent, or Firm* — Thorpe. North & Western, LLP

(57) ABSTRACT

A system for incorporation into a manually controlled vehicle to provide unmanned operational capability to the vehicle, comprising: a quantity of subsystem controllers, including at least: a throttle controller, integratable with an existing throttle system of the vehicle; a brake controller, integratable with an existing brake system of the vehicle; and a steering controller, integratable with an existing steering system of the vehicle; and a master actuator/control system, installable within the vehicle and being operably coupleable to each of the subsystem controllers.

6 Claims, 5 Drawing Sheets

(56) References Cited

OTHER PUBLICATIONS

Cultiva, "Press Release Cultiva OnTrac Auto-Steering," Nov. 18, 2004, 2 pages, http://www.innotag.com/pdf/20041201communiquieA.pdf.

Klarquist, William, et al., "Intelligent Vehicle Safety Technologies 1 Technical Description," Aug. 29, 2005, 23 pages, http://www.darpa.mil/grandchallenge05/techpapers.html.

Mason, Richard, "The Golem Group/UCLA, DARPA Grand Challenge Technical Paper,"2005.

Mitchell Repair Information Company; Steering Columns, Honda Accord, Civic & Prelude; 2003; 2 pages; Mitchell Repair Information Company.

Murray, Richard M., et al, "DARPA Technical Paper: Team Caltech," Aug. 29, 2005, 14 pages, http://www.darpa.mil/grandchallenge05/techpapers.html.

Stanford Racing Team, "Stanford Racing Team's Entry in teh 2005 DARPA Grand Challenge," 2005, no moth, no day, 14 pages, http://www.darpa.mil/grandchallenge05/techpapers.html.

Stout, Cherry Brieser, "New OnTrac System Features Ease of Use," 2006, 03, no day, 1 page, http://magissues.farmprofess.com/mif/MF03Mar06/mif26.pdf.

Team Terramax, "Team Terramax, DARPA Grand Challenge 2005," 2005, no month, no day, 14 pages, http://www.darpa.mil/granchallenge05/techpapers.html.

Trepagnier, Paul G., et al., "Team Gray Technical Paper, DARPA Grand Challenge 2005," Aug. 28, 2005, 13 pages, http://www.darpa.mil.grandchallenge05/techpapers.html.

Wicks, Albert, et al., "Virginia Tech Team Rocky DARPA Grand Challenge 2005," 2005, no month, no day, 13 pages, http://www.darpa.mil/granchallenge05/techpapers.html.

* cited by examiner

UNMANNED VEHICLE RETROFITTING SYSTEM

PRIORITY CLAIM

Priority is claimed of U.S. Provisional Patent Application Ser. No. 61/170,025, filed Apr. 16, 2009, which is hereby incorporated herein by reference in its entirety.

This application is related to U.S. Provisional Patent Application Ser. No. 60/839,875, filed Aug. 24, 2006, and U.S. patent application Ser. No. 11/895,639, filed Aug. 24, 2007, each of which is hereby incorporated herein by reference in its entirety.

BACKGROUND OF THE INVENTION

1. Field of the Invention

The present invention relates generally to systems that can be incorporated with an existing vehicle to provide the vehicle with unmanned operational capability.

2. Related Art

The benefits of unmanned vehicles (e.g., vehicles that are operational without a human operator being present within the vehicle) are becoming increasingly appreciated. Such vehicles can be used to perform tasks that might otherwise expose human operators to unacceptable risks, and in tasks so mundane that the presence of human operators may be a waste of resources. Use of unmanned vehicles can be beneficial in a variety of hazardous environments including combat areas, hazardous waste areas, etc. As an example of the burgeoning acceptance of such vehicles, the United States Congress mandated in 2001 that one-third of all military land vehicles be autonomous by the year 2015, and that two-thirds be autonomous by the year 2025.

In response to the need for such vehicles, a variety of unmanned ground vehicles ("UGVs") have been developed. While work with conventional UGVs has advanced the science behind the design, manufacture and operation of such vehicles, conventional UGVs suffer from a number of disadvantages. For example, most UGVs are designed and built solely for use as UGVs and, as such, are often very expensive to build and complex to operate. Also, most conventional UGVs are not manually operable by human drivers (e.g., a human operator can not easily or quickly assume local, manual control of the vehicle). In addition, conventional UGVs are generally clearly identifiable as such: a disadvantage when it may be desirable to conceal from unfriendly factions the fact that a vehicle is unmanned.

SUMMARY OF THE INVENTION

The invention provides a system for incorporation into a manually controlled vehicle to provide unmanned operational capability to the vehicle, including a quantity of subsystem controllers, including: a throttle controller, integratable with an existing throttle system of the vehicle; a brake controller, integratable with an existing brake system of the vehicle; and a steering controller, integratable with an existing steering system of the vehicle. An actuator control system can be operably coupleable to each of the subsystem controllers. The actuator control system can be capable of enabling remote or automated control of each of the subsystem controllers. An interrupt device can be operably coupled to the actuator control system. The interrupt device can provide selective: i) actuation of the actuator control system to provide remote or automated control of the subsystem controllers; and ii) deactivation of the actuator control system to return the subsystem controllers to a manually controlled state.

In accordance with another aspect of the invention, a system for incorporation into a manually controlled vehicle to provide unmanned operational capability to the vehicle is provided, including a quantity of subsystem controllers, including at least: a throttle controller, integratable with an existing throttle system of the vehicle; a brake controller, integratable with an existing brake system of the vehicle; and a steering controller, integratable with an existing steering system of the vehicle. An actuator control system can be operably coupleable to each of the subsystem controllers. The actuator control system can enable remote or automated control of each of the subsystem controllers. Each of the subsystem controllers can be operably incorporated into the vehicle while each of the existing throttle system, brake system and steering system of the vehicle remains intact with the vehicle.

In accordance with another aspect of the invention, a system for incorporation into a manually controlled vehicle to provide unmanned operational capability to the vehicle is provided, including a quantity of subsystem controllers, including at least: a throttle controller, integratable with an existing throttle system of the vehicle; a brake controller, integratable with an existing brake system of the vehicle; and a steering controller, integratable with an existing steering system of the vehicle. An actuator control system can be operably coupled to each of the subsystem controllers. The actuator control system can enable remote or automated control of each of the subsystem controllers. The steering subsystem controller can be operably attached to an existing steering wheel of the vehicle while the steering wheel remains attached to the vehicle.

In accordance with another aspect of the invention, a method for retrofitting a vehicle to provide unmanned operational capability to the vehicle is provided, including: integrating a throttle controller with an existing throttle system of the vehicle; integrating a brake controller with an existing brake system of the vehicle; integrating a steering controller with an existing steering system of the vehicle; and connecting an actuator control system to each of the subsystem controllers, the actuator control system enabling remote or automated control of each of the subsystem controllers; and interfacing an interrupt device with the actuator control system, the interrupt device providing selective: i) actuation of the actuator control system to provide remote or automated control of the subsystem controllers; and ii) deactivation of the actuator control system to return the subsystem controllers to a manually controlled state.

There has thus been outlined, rather broadly, relatively important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Figure 1:
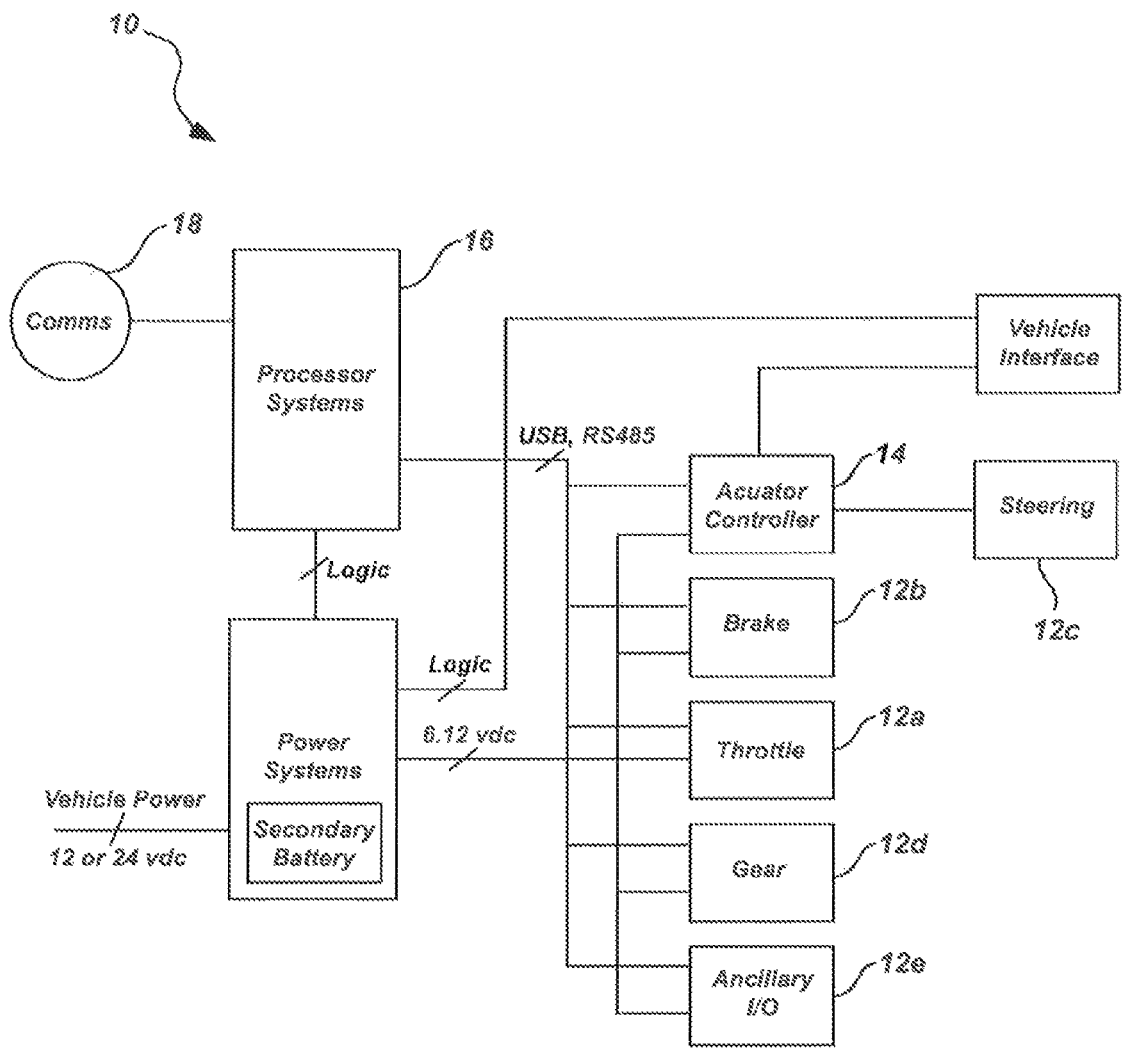
FIG. 1 is a schematic representation of a system for retrofitting a manually operable vehicle to be remotely or automatically controlled.

Before the present invention is disclosed and described, it should be understood that this invention is not limited to the particular structures, process steps, or materials disclosed herein, but is extended to equivalents thereof as would be recognized by those of ordinarily skill in the relevant arts. It should also be understood that terminology employed herein is used for the purpose of describing particular embodiments only and is not intended to be limiting in any way.

It must be noted that, as used in this specification and the appended claims, the singular forms "a" and "the" include plural referents, unless the context clearly dictates otherwise. Thus, for example, reference to a "controller" can, but does not necessarily, include one or more of such controllers.

DEFINITIONS

In describing and claiming the present invention, the following terminology will be used in accordance with the definitions set forth below.

As used herein, the term "vehicle" is to be understood to refer to a variety of vehicles, including, without limitation, automobiles, trucks, SUVs, boats, etc. Generally, the present invention can be utilized with substantially any steering-wheel based vehicle, including land- and water-based vehicles, amphibious vehicles and the like.

As used herein, the term "substantially" refers to the complete or nearly complete extent or degree of an action, characteristic, property, state, structure, item, or result. The exact allowable degree of deviation from absolute completeness may in some cases depend upon the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

Distances, angles, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. This same principle applies to ranges reciting only one numerical value and should apply regardless of the breadth of the range or the characteristics being described.

THE INVENTION

The present invention is directed to systems and methods that can allow users to convert a conventional, existing steering wheel-based vehicle to a remotely piloted vehicle, a remotely guided vehicle, or an autonomously guided vehicle. Generally speaking, the invention provides a retrofit kit that can be installed in an otherwise operable, conventional vehicle to allow the vehicle operate in an unmanned mode, thus resulting in a Remotely Piloted Vehicle (RPV), a Remotely Guided Vehicle (RGV) or an Autonomously Guided Vehicle (AGV). The resultant UGV can be used in a wide range of operations including, without limitation, leading, following, intelligent GPS tracking with obstacle avoidance, and the like. The resultant converted vehicle can travel at various speeds (<15 mph, 16-40 mph, 41-60 mph and so forth) in RPV, RGV or AGV mode.

The present systems are modular in nature and adaptable for multi-role operations. In many embodiments, the retrofit system is designed to rely primarily on passive sensors such that many of these systems can operate together without interference. Advantageously, the resultant vehicle performs well in dual use environments: either manually operated (e.g., driven by a human) in normal capacity, or remotely or automatically controlled with no local, on board operator. The system can allow third-party auxiliary systems, such as vision systems, inertial navigation systems, GPS systems, emergency stop systems, manipulator arm systems, etc., to be easily incorporated into the vehicle being modified. The present is scalable—it can be built according to customer specifications from best commercial practices to military standards. Notably, once installed, the present invention allows an operator whose training is limited to operation of a standard vehicle to operate the The system can be "field" installed on a variety of steering wheel-based vehicles and can be installed by technicians that have the equivalent skill set of technicians trained to install car stereos. It can be installed using common hand tools, and a typical installation is minimally invasive to an existing vehicle. As discussed in greater detail below, the system can be installed with the existing steering wheel of vehicle remaining attached to, and operable with, the vehicle (e.g., without the need to remove and then re-install the steering wheel and/or steering column). The system can be installed in the interior spaces or areas of the vehicle: as such, the exterior cosmetics of the vehicle remain unchanged, effectively masking the fact that the vehicle is unmanned.

The system is not make- or model-specific, and thus can be installed in a variety of types, sizes and models of vehicles. The system can be relatively easily removed from a vehicle, after which the vehicle will perform and maneuver in the same manner as it did prior to installation.

As shown generally in FIG. 1, in one aspect of the invention, a system 10 is provided for incorporation into an otherwise manually controlled vehicle to provide unmanned operational capability to the vehicle. The system can include a quantity of subsystem controllers, which can include, without limitation, a throttle controller 12a, a brake controller 12b, a steering controller 12c, a gear (e.g., transmission) controller 12d, etc. Each of the subsystem controllers can be integratable with an existing system of the vehicle. That is, the brake controller can be integratable with an existing brake system of the vehicle, the steering controller can be integratable with an existing steering system of the vehicle, etc. An ancillary controller 12e can provide control of ancillary or auxiliary systems such as headlights, turn signals, door locks, windshield wipers, etc.

An actuator control system 14 can be operably coupleable to each of the subsystem controllers. The actuator control system can be capable of enabling remote or automated control of each of the subsystem controllers. An interrupt device (not shown) can be associated with one or more of the subsystem controllers (or the actuator control system). The interrupt device can provide selective: i) actuation of the actuator control system to provide remote or automated control of the subsystem controllers; and ii) deactivation of the actuator control system to return the subsystem controllers to a manually controlled state. Thus, the interrupt device can enable an operator to quickly and easily assume manual control of the vehicle and operate (e.g., drive) the vehicle as the vehicle would normally be driven.

While the interrupt device can vary, in one aspect of the invention it is incorporated into the existing braking system of the vehicle such that an operator can assume manual control of the vehicle by simply tapping on the brake, much like a cruise control system found in a variety of commercial vehicles. Generally, the system can be installed in the vehicle such that all standard operating systems of the vehicle are not disturbed from their existing state during or after installation. As such, as soon as the system receives an interrupt signal, manual operation of the vehicle can be undertaken almost immediately, without requiring that a technician perform further modification of the vehicle.

The system can include a robust processing system 16 electronically coupled to a communications system 18 to allow control of the vehicle in a variety of manners. For example, once installed in the vehicle, the present system can render the vehicle operable as a Remotely Piloted Vehicle (RPV), a Remotely Guided Vehicle (RGV), and/or an Autonomous Ground Vehicle (AGV). In the RPV mode, a remote operator can control steering, acceleration, braking, etc., of the vehicle from afar (using feedback provided video cameras, the use and installation of which are well known to those having ordinary skill in the art). In RGV mode, a remote operator can provide general guidance to the vehicle, with at least some automated systems being available for adjustments due to terrain, obstacle avoidance, etc. In AGV mode, nearly all control commands are issued by onboard controllers. In one example of AGV mode operation, a predetermined course can be provided to the control system of the vehicle, and the control system can adjust navigation of the vehicle through the course.

Figure 2A:
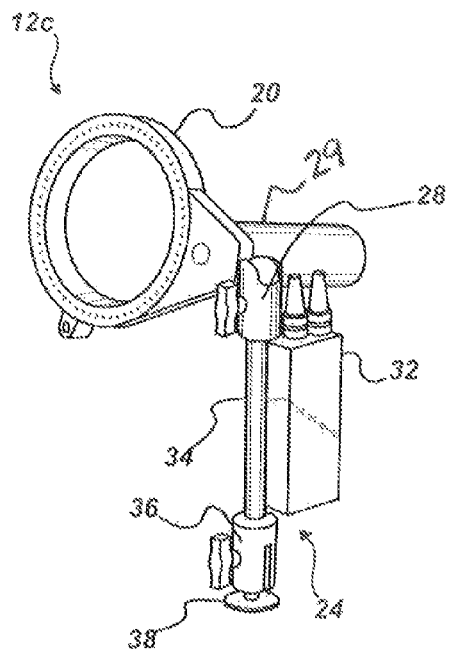
FIG. 2A is a perspective view of an exemplary steering controller in accordance with an embodiment of the invention.
Figure 2B:
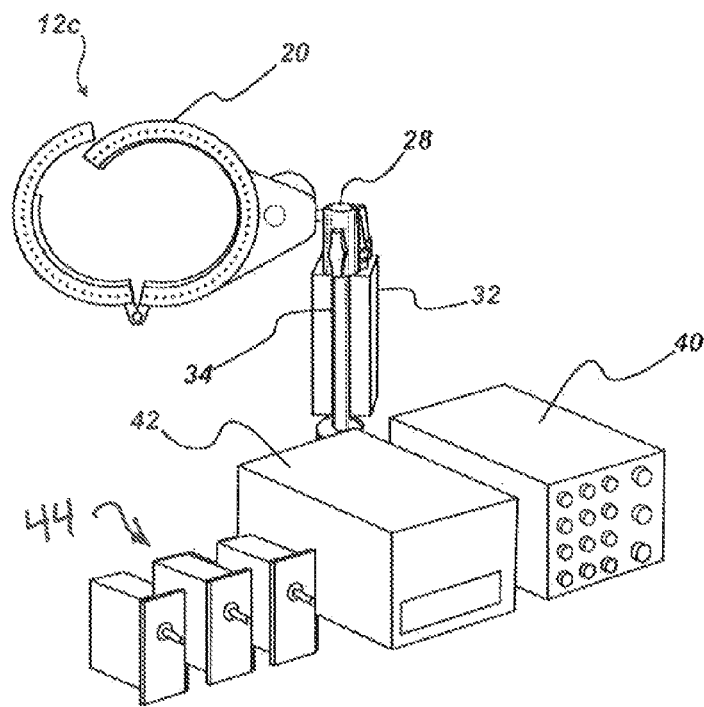
FIG. 2B is a perspective view of the steering controller of FIG. 2A, shown in a partially opened configuration.
Figure 3:
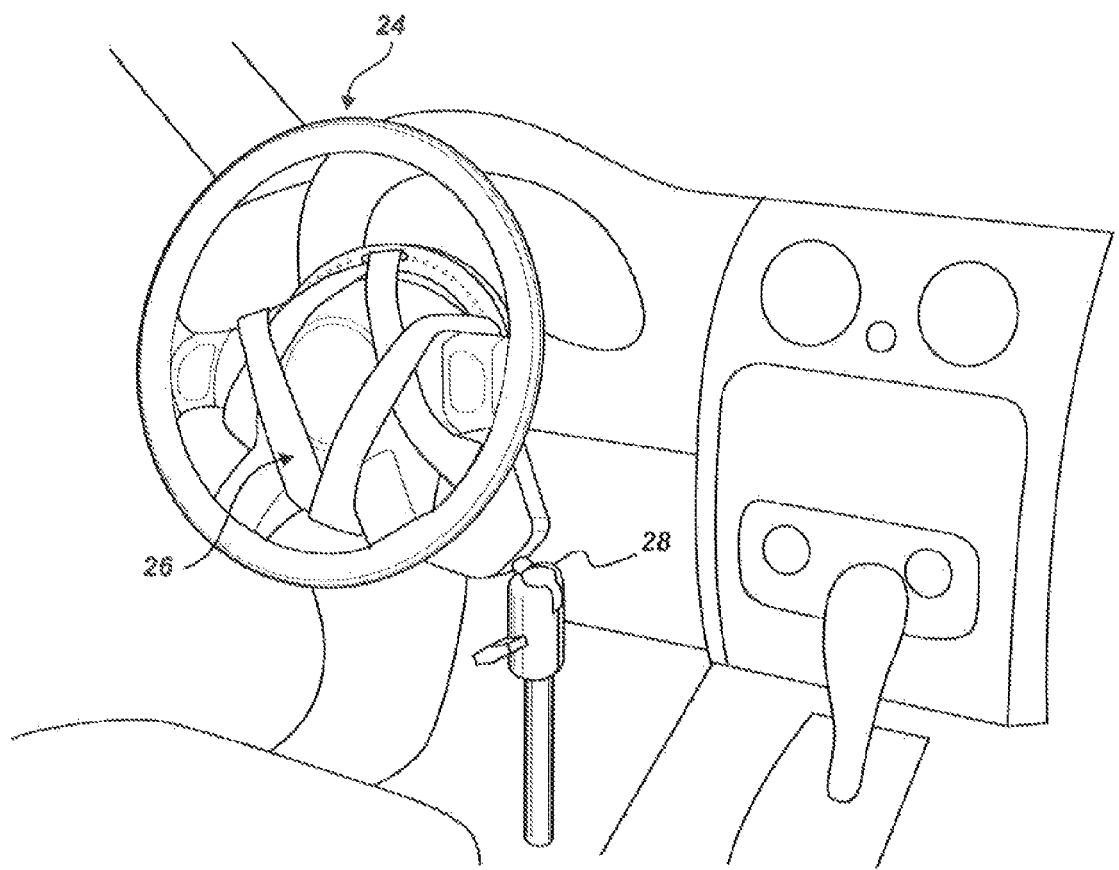
FIG. 3 is a perspective view of the steering controller of FIG. 2A, shown coupled to a steering wheel in accordance with an embodiment of the invention.

Turning now to FIGS. 2A, 2B and 3, in one aspect of the invention, the steering subsystem controller 12c can be operably attached to an existing steering wheel (24 in FIG. 3) of the vehicle while the steering wheel remains attached to the vehicle. To facilitate this, the steering subsystem controller can include an actuatable ring collar 20 that can be installed about the existing steering column (not visible in FIG. 3) of the vehicle. One or more straps (26 in FIG. 3) can couple the steering wheel to the ring collar such that, as the ring collar rotates, actuation of the steering wheel is achieved. Control of up to about +/−450° of adjustment can be obtained by way of the configuration shown.

The actuatable ring collar 20 can be operably connected to pivotal mount 28, and coupled to rotation actuator 29. The combination of translational movement by mount 28 (as discussed below) and rotational movement of actuator 29 can provide steering ring adjustments and movements in each of X, Y and Z planes. A power source (e.g., a 12 vdc motor) 32 can power the steering ring. Pivotal mount 28 can be connected to a dual-end, female threaded extension pipe 34, which can be coupled to another pivotal mount 36. Base mount 38 can be relatively rigidly coupled to the floor of the vehicle, in relatively close proximity to the steering wheel and column, via a variety of fastening configurations known to those of ordinary skill in the art. Extension controller 42 can be mounted to extension pipe 34 via mechanical fasteners such as "zip ties," metal mounts, bolts and the like. Thus, the actuatable ring collar can be rotated, relative to the steering column of the vehicle, to rotate the steering wheel and effectuate steering of the vehicle.

As shown in FIG. 2B, in one aspect of the invention, the ring collar 20 can be openable, to allow installation of the ring collar around a steering column without requiring that the steering wheel of the vehicle be removed (a time consuming and sometimes complex job). Also shown in FIG. 2B are a series of representative control systems that can be utilized to control steering, braking, throttle, etc., of the vehicle. A power module 40 can be used to power various subsystems of the invention. Processing module 42 can be used to provide control commands to the various subsystem controllers. Generic actuators 44 can be used to actuate the various subsystems.

Figure 4:
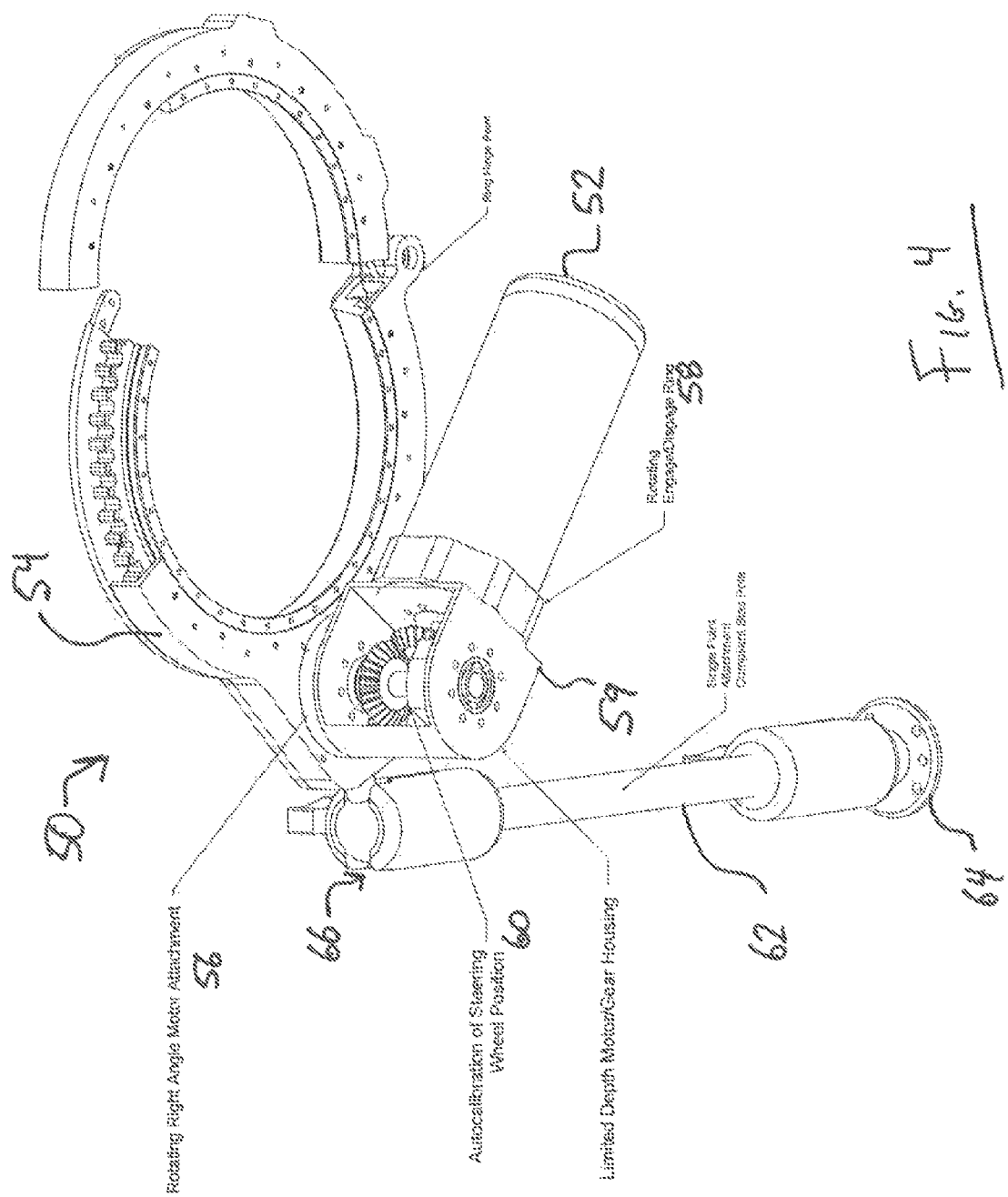
FIG. 4 is a perspective view of another steering controller in accordance with an embodiment of the invention.
Figure 5:
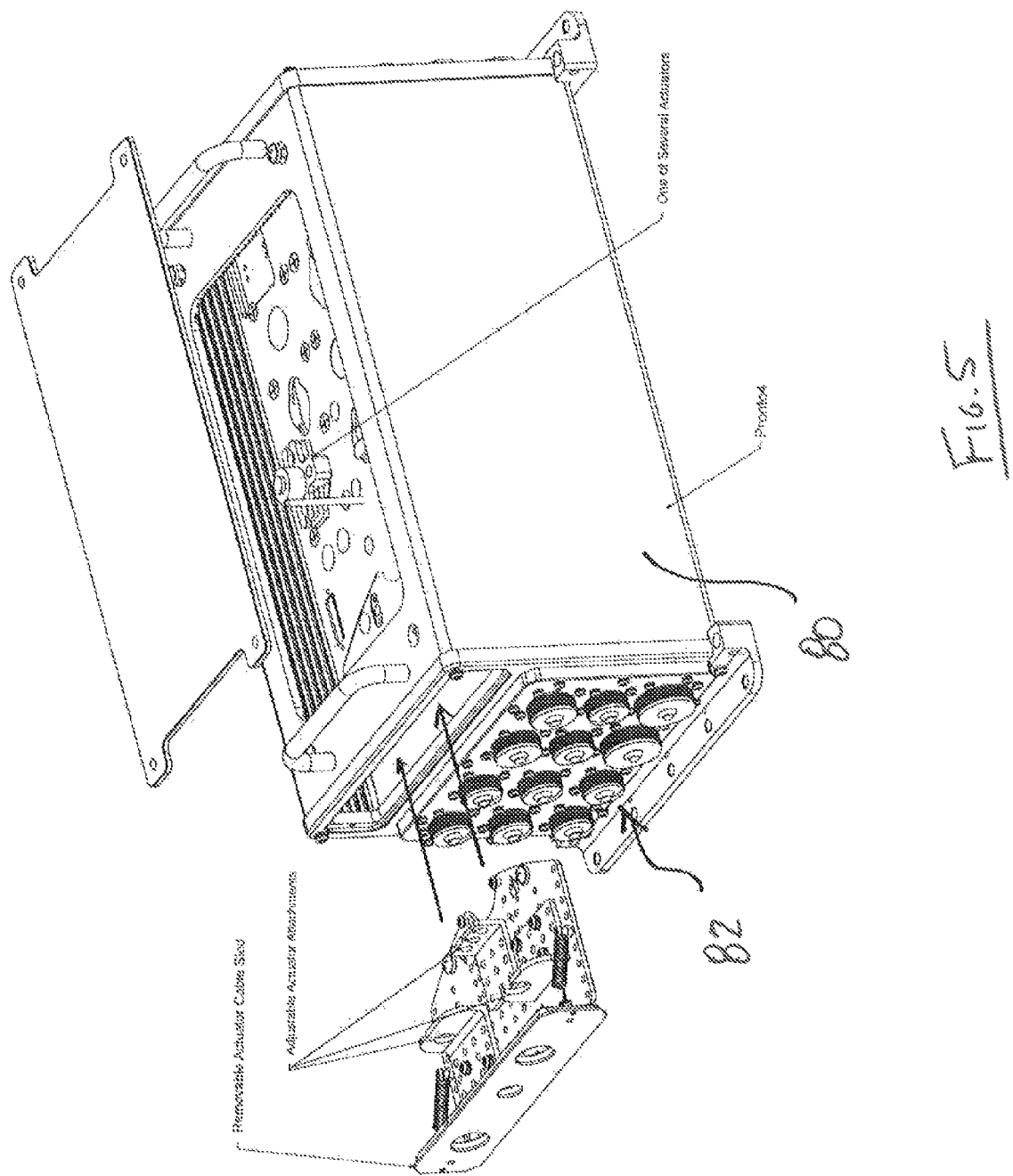
FIG. 5 is a perspective view of an interchangeable control system in accordance with an aspect of the invention.

As shown in FIGS. 4 and 5, the system can include a steering controller system 50. The system can include a steering motor or actuator 52 that can be oriented at an angle relative to steering collar 54. In the embodiment shown, the motor or actuator is oriented at an angle of about 90 degrees relative to a plane of the collar. The angled attachment can allow the system to be installed into vehicles that include very little clearance area below or adjacent the conventional steering wheel of the vehicle (many boats, for example, include little clearance area adjacent the steering wheel).

The motor or actuator can be attached via a motor attachment 56 that can allow the motor to rotate relative to the steering collar 54. A quick-connect ring 58 can be installed between the actuator 52 and the gear housing 59 to allow quick disconnect of the actuator from the steering wheel assembly to allow a quick return to "free-wheeling" condition when desired (e.g., the steering column and wheel can be made to turn freely without removing the actuator 52).

The system can include an auto-calibration system 60 that is operable to automatically "zero" the steering wheel when the system is initially powered up. In this embodiment, the steering actuator system can be brought to center when the vehicle is powered up. A sensor (not shown) can be calibrated when the system is installed to retain knowledge of the zero position and return the steering controller to this position when desired.

This system can be attached via a single point attachment. As will be appreciated, the steering actuator is mounted atop a support post or pole 62 that attaches in a single location to the floor of the vehicle (via bracket 64). The attachment of the steering collar to the support pole is similarly through a single point of attachment (see knuckle 66). This manner of attachment provides enormous advantages over conventional systems, as it can be very difficult to securely attach a steering actuating system in the field and do so with a high degree of precision. The present invention allows for large degrees of misalignment of the various components of the system without affecting the precision with which the system operates. In other words, the attachment system (62, 64, 66, etc.) can tolerate movement of the overall system without affecting the precision with which the system can guide or steer the vehicle in question.

The system can include a master controller/actuator module 80. In this aspect, substantially all controllers and actuators used in the system can be incorporated into a single "sled" that can be easily and quickly installed and removed from a vehicle. It is estimated that approximately 85%-95% of the total costs of equipment utilized in the present invention to retrofit a vehicle can be held within the master controller 80. In this manner, in the event one or more components fail, the time to repair the system and return it to operation can be as little as 5 minutes.

The master controller 80 can include connection ports 82 that allow electrical and mechanical coupling to the various operating systems of the vehicle (e.g., acceleration, braking, steering, etc.) though cables and the like to allow actuation and control of the various operating systems of the vehicle. In a typical application, the master controller can be installed within a vehicle, and attached to each operable system of the vehicle, in as little as 5 minutes with virtually no tooling required.

In addition, all required data storage and processing can be done within the master controller 80. Thus, in the event a customer owns or operates more than one retrofitted vehicle, a single master controller can be utilized and can be "switched out" between vehicles to simplify control of the various vehicles and to reduce costs associated with retrofitting each vehicle. Data unique to each vehicle can be stored in, and maintained with, the master controller even when the master controller is removed from a vehicle in question, or is installed within another vehicle.

In addition to the structural features discussed above, the present invention also provides a method for retrofitting a vehicle to provide unmanned operational capability to the vehicle, comprising: integrating a throttle controller with an existing throttle system of the vehicle; integrating a brake controller with an existing brake system of the vehicle; integrating a steering controller with an existing steering system of the vehicle; and connecting an actuator control system to each of the subsystem controllers, the actuator control system enabling remote or automated control of each of the subsystem controllers; and interfacing an interrupt device with the actuator control system, the interrupt device providing selective: i) actuation of the actuator control system to provide remote or automated control of the subsystem controllers; and ii) deactivation of the actuator control system to return the subsystem controllers to a manually controlled state.

In accordance with one aspect of the invention, the interrupt device can be coupleable to an existing brake pedal of the vehicle. This can be accomplished in a variety of manners. The following description can be applied to a variety of subsystem control schemes, including the brake control system (and interrupt system).

Generally, each of the brake, throttle, steering, etc. subsystem controllers can include a component or components that can, for example, be securely clamped (or otherwise connected) to the existing controls using mechanical overriding couplings. The brake override can be clamped to the existing brake pedal, the throttle override can be clamped to the existing carburetor throttle body, the transmission can be clamped to the existing shifting lever (in which case the shift detents may be defeated), etc. The steering override device (see FIGS. 2A through 3) can be clamped or strapped around or to the steering wheel. The actuators clamped in such a manner can be attached in such a way as to not impede human operation of the vehicle components. The override coupling approach allows either the human or the computer to actuator the control independently. Software interlocks can be used to determine if the human operator is commanding control of the vehicle. For example, if the human operator is attempting to actuate a controller (throttle, brake, steering, etc.) then the computer/control system can return control to the human operator.

In one aspect of the invention, the interrupt device or system can be configured to sense that the operator is actuating the brake pedal: e.g., the interrupt system can monitor voltage to the brake light—when the brake light is activated, the system can release control of the vehicle to the operator. The present system uses a sensor (well known in the art) to sense whether or not the brake light is activated. If it is, the system performs a validation sequence. The validation sequence initially will release throttle control, then check to see if the voltage is still applied to the brake light. If the voltage is still applied (e.g., if the human is still pressing the brake light) after a period of time then steering, throttle and brake control are released to the operator and the human operator has control. By mechanically overriding each of the subsystems, this seamless switching can occur very quickly.

The mechanical overriding is facilitated by strategic placement and attachment of the actuators subsystem controllers/actuators. In one aspect, the brake is clamped to the brake pedal in such a way that it actuates the brake pedal without interfering with the portion of the pedal that the human uses to depress the pedal. The brake pedal is depressed (e.g., mechanically activated) in either of two cases: if the human depresses the brake pedal, or if the computer depresses the brake pedal. Generally, the mechanical override just operates a bit further up the brake pedal.

With regard to the throttle, the present system uses an approach similar to that commonly used to provide "cruise control." The computer pulls on the throttle body without impeding the ability of the human to pull on the throttle body by way of the accelerator pedal. This type of mechanical overriding system is unique to the present application, and provides great flexibility to an unmanned vehicle overhaul system.

In one aspect of the invention, the interrupt device or system includes a determination by the computer that the human operator is trying to gain control of one or more of the subsystem controls. The computer merely ensures that the human is actually attempting to use them (by checking again after a short time interval), and not just a momentary braking in order to decelerate. Once this determination is made, then control of the subsystems can be released to the human.

Examples of mechanical override systems include, without limitation: a lever with two holes drilled in it, with one cable passing through each hole from the front of the lever: and a knot formed in the end of each cable on the back side of the lever. When the first cable or the second cable is pulled, the lever is actuated. The knot prevents the cable from pulling through the hole, and so the pull force is transferred to the lever. If the first cable is pulled, however, the second cable is "compliant" and does not impede the operation of the first cable (it slides through the hole).

The mechanical, "clamp" override systems of the present invention allow human scale force controls (steering, brake, throttle, transmission, etc.) rendering the present system non-invasive. The combination of computer sensing and mechanical overriding gives the system the ability to seamlessly detect the desire for human control, determine insistence of the desire for that control and then return (interrupt) control to the operator. Human scale control also allows the present system to be attached to virtually any vehicle that is normally controlled by a human.

The mechanical, "clamp" override system also provides for rapid installation and de-installation of the system with minimal (almost nonexistent) disturbance or modification to the vehicle. In addition, electrical interlocks can be used to keep inappropriate cross function combinations from occurring (e.g., the electrical interlock can prevent computer throttle from occurring when manual or computer brake is also occurring).

The fact that the present system can automatically detect and then return control to the human operator in a seamless fashion enables the concept of an optionally unmanned system that can be driven by a human operator having no training on the usage of autonomy system (since substantially none of the common, human scale controls are modified from their original usage).

In accordance with one embodiment of the invention, integrating the steering controller with the existing steering system of the vehicle can include installing a control ring about a steering column of the vehicle and securing the control ring to a steering wheel of the vehicle.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for incorporation into a manually controlled vehicle to provide unmanned operational capability to the vehicle, comprising:
    a quantity of subsystem controllers, including at least:
        a throttle controller, integratable with an existing throttle system of the vehicle;
        a brake controller, integratable with an existing brake system of the vehicle; and
        a steering controller, integratable with an existing steering system of the vehicle, the steering controller including an openable collar, installable over a steering column of the vehicle; and
    a master actuator/control system, installable within the vehicle and being operably coupleable to each of the subsystem controllers, the master actuator/control system capable of enabling remote or automated control of each of the subsystem controllers; wherein
    the master actuator/control system is interchangeable between a plurality of vehicles and maintains storage of data relevant to each of the plurality of vehicles whether or not installed in any particular vehicle;
    wherein the steering controller can be integrated with the existing steering system of the vehicle while a steering wheel of the vehicle remains attached to the vehicle, and further comprising at least one strap, engageable with the steering controller and the steering wheel of the vehicle to enable control of the steering wheel with the steering controller.

2. The system of claim 1, wherein deactivation of the actuator control system returns the subsystem controllers to a manually controlled state without requiring modification of the subsystem controllers.

3. The system of claim 1, wherein substantially all components of the system are installable in an interior space of the vehicle.

4. The system of claim 1, wherein the system is capable of rendering the vehicle operable as all of: a Remotely Piloted Vehicle (RPV), a Remotely Guided Vehicle (RGV), and an Autonomous Ground Vehicle (AGV).

5. The system of claim 1, wherein the system is powerable by an existing power source of the vehicle.

6. The system of claim 1, wherein the steering controller includes an openable collar, installable over a steering column of the vehicle.

* * * * *